(12) United States Patent
Fujita et al.

(10) Patent No.: US 7,704,066 B2
(45) Date of Patent: Apr. 27, 2010

(54) HEAT INSULATING STAMPER STRUCTURE

(75) Inventors: Shigeru Fujita, Kanagawa (JP);
Kazuhiro Kotaka, Kanagawa (JP);
Nobuhiro Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 167 days.

(21) Appl. No.: 10/582,018

(22) PCT Filed: Oct. 19, 2005

(86) PCT No.: PCT/JP2005/019642

§ 371 (c)(1),
(2), (4) Date: Jun. 7, 2006

(87) PCT Pub. No.: WO2006/043708

PCT Pub. Date: Apr. 27, 2006

(65) Prior Publication Data

US 2007/0126136 A1 Jun. 7, 2007

(30) Foreign Application Priority Data

Oct. 21, 2004 (JP) ............................ 2004-306272

(51) Int. Cl.
*G11B 7/26* (2006.01)
(52) U.S. Cl. .................. 425/385; 425/193; 425/195; 425/810; 249/80; 249/11; 249/116
(58) Field of Classification Search ............. 249/111, 249/114.1, 116, 134, 135, 79, 80, 187.1; 425/190, 192 R, 193, 195, 385, 810, 174.4; 428/457

See application file for complete search history.

(56) References Cited

U.S. PATENT DOCUMENTS

| | | | | |
|---|---|---|---|---|
| 3,593,376 A | * | 7/1971 | Kisker et al. | 425/346 |
| 3,649,144 A | * | 3/1972 | Breck, Jr. | 425/136 |
| 3,779,684 A | * | 12/1973 | Folkes | 425/233 |
| 3,925,597 A | * | 12/1975 | Misiura et al. | 174/102 SC |
| 4,018,552 A | * | 4/1977 | Prast et al. | 425/407 |
| 4,556,378 A | * | 12/1985 | Nyfeler et al. | 425/143 |

(Continued)

FOREIGN PATENT DOCUMENTS

JP  05-200757  8/1993

(Continued)

OTHER PUBLICATIONS

Shozo Murata et al., "Development of Heat Insulation Stamper for CD-R Media Production," Research and Development Group, manufacturing Technology Research and Development Center, Ricoh Technical Report No. 27, pp. 77-82, Nov. 2001.*

(Continued)

*Primary Examiner*—Steven P Griffin
*Assistant Examiner*—Seyed Masoud Malekzadeh
(74) *Attorney, Agent, or Firm*—Dickstein Shapiro LLP

(57) ABSTRACT

A heat insulating stamper is disclosed. The heat insulating stamper includes an uppermost section made of a metal material, a lowermost section made of the same material as the uppermost section, and a middle section having a heat conductivity lower than the uppermost section. The middle section includes the same metal material as the uppermost section and the lowermost section, and heat insulating portions.

8 Claims, 10 Drawing Sheets

U.S. PATENT DOCUMENTS

| | | | | |
|---|---|---|---|---|
| 4,784,893 | A * | 11/1988 | Nishimoto et al. | 428/209 |
| 4,854,845 | A * | 8/1989 | Couderc et al. | 425/363 |
| 5,051,083 | A * | 9/1991 | Coluzzi | 425/174.8 R |
| 5,202,206 | A * | 4/1993 | Tam | 430/41 |
| 5,206,762 | A * | 4/1993 | Kasahara et al. | 359/814 |
| 5,362,226 | A * | 11/1994 | Kataoka et al. | 425/526 |
| 5,368,789 | A * | 11/1994 | Kamitakahara et al. | 264/1.33 |
| 5,505,600 | A * | 4/1996 | Ureshino et al. | 425/28.1 |
| 5,593,526 | A * | 1/1997 | Yokouchi et al. | 156/89.15 |
| 5,676,983 | A * | 10/1997 | Bacher et al. | 425/385 |
| 5,705,237 | A * | 1/1998 | Andersen et al. | 428/34.4 |
| 5,766,525 | A * | 6/1998 | Andersen et al. | 264/40.1 |
| 5,878,314 | A * | 3/1999 | Takaya et al. | 399/302 |
| 5,993,189 | A * | 11/1999 | Mueller et al. | 425/405.1 |
| 6,042,894 | A * | 3/2000 | Goto et al. | 427/504 |
| 6,063,173 | A * | 5/2000 | Torii et al. | 106/31.17 |
| 6,068,722 | A * | 5/2000 | Yu et al. | 156/137 |
| 6,146,558 | A * | 11/2000 | Feist et al. | 264/1.33 |
| 6,165,391 | A * | 12/2000 | Vedamuttu | 264/1.33 |
| 6,171,527 | B1 * | 1/2001 | Warino et al. | 264/1.33 |
| 6,276,656 | B1 * | 8/2001 | Baresich | 249/79 |
| 6,302,674 | B1 * | 10/2001 | Arakawa et al. | 425/192 R |
| 6,408,754 | B2 * | 6/2002 | Siler et al. | 101/401.1 |
| 6,468,618 | B1 * | 10/2002 | Murata et al. | 428/64.1 |
| 6,635,979 | B1 * | 10/2003 | Shiratori et al. | 313/309 |
| 6,797,414 | B2 * | 9/2004 | Sakaguchi | 428/690 |
| 6,852,420 | B2 * | 2/2005 | Yamamoto et al. | 428/446 |
| 6,864,034 | B2 * | 3/2005 | Nishida et al. | 430/200 |
| 6,864,130 | B2 * | 3/2005 | Koo et al. | 438/166 |
| 6,897,478 | B2 * | 5/2005 | Koo et al. | 257/59 |
| 7,094,048 | B2 * | 8/2006 | Mishra et al. | 425/407 |
| 7,134,879 | B2 * | 11/2006 | Sugimoto et al. | 439/66 |
| 7,156,640 | B2 * | 1/2007 | Furuya et al. | 425/195 |
| 7,473,994 | B2 * | 1/2009 | Hirano | 257/701 |
| 2001/0029236 | A1 * | 10/2001 | Kutami et al. | 503/201 |
| 2002/0014169 | A1 * | 2/2002 | Siler et al. | 101/138 |
| 2002/0179449 | A1 * | 12/2002 | Domeier et al. | 205/67 |
| 2002/0182402 | A1 | 12/2002 | Murata et al. | |
| 2002/0187367 | A1 * | 12/2002 | Sakaguchi | 428/690 |
| 2003/0006535 | A1 * | 1/2003 | Hennessey et al. | 264/403 |
| 2003/0209711 | A1 * | 11/2003 | Yang et al. | 257/66 |
| 2004/0109915 | A1 * | 6/2004 | Murata et al. | 425/566 |
| 2004/0159863 | A1 * | 8/2004 | Eldridge et al. | 257/239 |
| 2004/0217342 | A1 * | 11/2004 | Kokubo et al. | 257/9 |
| 2004/0227263 | A1 * | 11/2004 | Gorczyca et al. | 264/1.33 |
| 2005/0247393 | A1 * | 11/2005 | Misani et al. | 156/123 |
| 2006/0188600 | A1 * | 8/2006 | Inoue | 425/542 |
| 2007/0063390 | A1 * | 3/2007 | Massimo | 264/479 |

FOREIGN PATENT DOCUMENTS

| | | | |
|---|---|---|---|
| JP | 06272093 A | * | 9/1994 |
| JP | 10280009 A | * | 10/1998 |
| JP | 2001-071354 | | 3/2001 |
| JP | 2001-236698 | | 8/2001 |
| JP | 2001-273685 | | 10/2001 |
| JP | 2001-297488 | | 10/2001 |
| JP | 2002-083450 | | 3/2002 |
| JP | 2002-117593 | | 4/2002 |
| JP | 2002-150625 | | 5/2002 |
| JP | 2002-184046 | | 6/2002 |

OTHER PUBLICATIONS

Supplementary European Search Report dated Dec. 12, 2008 for App. No. 05798992.3.

* cited by examiner

FRONT SIDE

BACK SIDE

TEMPERATURE CHANGE
Ni vs Ni + F

— ● — Ni 30   — ○ — Ni 30 + F 3

HEAT INSULATING STAMPER STRUCTURE

TECHNICAL FIELD

The present invention relates to an optical disc substrate production, and particularly relates to a mold (stamper) with high durability for use in molding an optical disc substrate, a manufacturing method for the same, and production of an optical disc using the same.

BACKGROUND ART

Stampers having heat insulating layers for molding optical disc substrates have been known in the art. For example, Japanese Patent Laid-Open Publication No. 2002-184046 (Patent Document 1) discloses a stamper that has a simple polyimide layer as a heat insulating layer, and a method for manufacturing the stamper with improved curing conditions. This stamper includes a transfer metal layer with a pattern thereon, a second metal layer, and an insulating layer interposed between the transfer metal layer and the second metal layer and having approximately the same thermal expansion coefficient as the transfer metal layer. The quality of the stamper is improved due to a curing process divided into two steps of pre-curing for curing a resin layer after application of a heat insulating material and post-curing after formation of the metal layers, curing with heat conduction by hot pressing, and filling of pigment into an appropriately degenerated resin matrix.

Japanese Patent Laid-Open Publication No. 2002-83450 (Patent Document 2) discloses a heat insulating stamper with high durability that utilizes anchor effects of an interface by incorporation of filler into a coating layer, and a method for manufacturing the stamper. The coating layer incorporating the filler is provided so as to withstand shear stress generated between a heat insulating layer and a metal layer. The filler in the coating layer is exposed by etching and exerts anchor effects on a thick Ni layer. The heat insulating stamper is formed by sequentially laminating a transfer metal layer for transferring the shape of a resin surface, the heat insulating layer, and the metal layer. The heat insulating layer is connected to the metal layer through the coating layer that incorporates the filler, made of metal or an inorganic material, projecting to the metal layer from the connection interface. However, such a projecting filler structure can not be applied to a backside interface of the uppermost face. As a separation phenomenon mostly occurs at a backside interface of the uppermost face, this method is not very effective to improve durability of stampers.

Japanese Patent Laid-Open Publication No. 2001-297488 (Patent Document 3) discloses a stamper including a Ni plating layer, in place of a resin layer, at a peripheral part and an inner edge of the stamper so as to eliminate a point that causes a separation. According to a method for manufacturing this stamper, an electroplating layer having a predetermined thickness is formed on the entire surface of a glass master, which is provided with information recording grooves and subjected to conduction processing. Then, a boss-shaped plating portion is formed by electroforming at a predetermined part of a mirror surface inside and/or outside a recording region. A heat insulating layer having a predetermined thickness including a predetermined material is formed around the boss-shaped plating portion. After that, conduction processing is performed, and a thick electroplating layer is formed on the entire surface. Then a resulting stamper is removed from the glass master.

The stampers disclosed in Patent Documents 1 and 2 show improvements in initial quality. The stamper disclosed in Patent Document 3 shows improvements both in initial quality and quality after lapse of time. However, deterioration of a resin layer cannot be prevented.

Japanese Patent No. 3378840 (Patent Document 4) also discloses a method for manufacturing an optical disc substrate using a stamper. The method includes a step of injecting a molten resin into a cavity for the stamper defined by a pair of low-temperature molds that couple with each other, and a step of separating the molds to remove the resin after cooling. The stamper comprises a layer on which a transfer face for molding an optical disc substrate is formed, a heat insulating material provided along the transfer face on the layer, and a metal layer disposed on a face of the heat insulating material opposite to the face in contact with the transfer face. The thickness and heat conductivity of the heat insulating material are adjusted so as to prevent rapid cooling of the layer with the transfer face immediately after injection of the molten resin into the low-temperature molds and to cool the molten resin by the low-temperature molds in a subsequent process while maintaining a transfer property and reducing the time of an optical disk substrate molding cycle. According to Patent Document 4, heat resisting inorganic ceramics or metal is used as the heat insulating material. However, it is not easy to use heat resisting inorganic ceramics as the heat insulating material. This is because a sintering temperature of 1500° C. or higher is usually (not in an especially prepared environment) required during deposition, and also because an adhesive agent that resists a temperature of 300° C. or higher for use in a sintered product is rarely available (see "Development of heat insulation stamper" Ricoh Technical Report No. 27 (Non-Patent Document 1), p 79). Even if semimetal Bi (bismuth) is used as the insulating material, it is a little impractical because of its rough surface, its strength as low as one third of Ni, and its melting temperature of 271° C.

The invention disclosed in Patent Document 4 is positioned as a basic patent of a heat insulating stamper, and have no conflicts with other art prior thereto. There are published patent applications on the basis of the invention of Patent Document 4. For example, Japanese Patent Laid-Open Publication No. 2001-236698 (Patent Document 5) discloses a method for manufacturing a high-quality heat insulating stamper at low cost, which minimizes and saves consumption of source materials of the heat insulating layer, eliminates the need for a mask in a process of forming the heat insulating layer for simplifying the process and for improving working efficiency, and prevents irregularity in inner and outer peripheral edges of the heat insulating layer. According to Patent Document 5, while a stamper master including a lamination of multiple nickel films having a predetermined thickness is rotated, an applicator nozzle is moved on the stamper master in the radial direction so as to apply a solution of a heat insulating source material onto the stamper master in a concentric form or a spiral form. After resting and curing the stamper master, the solution of the heat insulating source material is spread in the radial direction of the stamper master to form a flat annular solution layer of the heat insulating source material. The solution layer is then cured to form an annular heat insulating layer. Japanese Patent Laid-Open Publication No. 2002-117593 (Patent Document 6) also discloses a stamper and a method for manufacturing the stamper. According to Patent Document 6, a polyimide sheet is applied to a glass master, on which a first nickel film is formed, so as to form a heat insulating layer made of a material having low heat conductivity and high heat resistance. Predetermined grooves are formed in the glass master in advance. Nickel plating of a predetermined thickness is formed by electroforming, and the heat insulating layer is separated from the glass master. An inner periphery and the outer periphery are stamped out along concentric circles having predetermined radiuses so as to produce a sophisticated annular stamper. Although the method has proven satisfactory, neither of the methods can completely solve problems resulting from a big difference in thermal and mechanical properties on an interface between a heat insulating layer and a metallic Ni layer.

A method for manufacturing a heat insulating stamper is disclosed in Japanese Patent Laid-Open Publication No. 2001-273685 disclosed by the applicant of this invention, and the method has been actually utilized in media production. However, it was found that when the number of times of stamping exceeds 100,000 times, occurrence of interfacial separation between a polymer layer and a Ni layer may increase. Therefore, inventors of the present invention have studied a new manufacturing method that further prolongs a stamper life in view of the following backgrounds.

Background 1: A Need for a Solution to Adhesion Instability

Elimination of line inspections and achievement of high resistance are desired.

Background 2: Adaptation to Demanding Molding Conditions Due to Growing Capacity The problem of lack of adhesion at a stamper interface is caused by changes of molding conditions (increasing resin temperature, increasing mold clamping force) due to growing media capacity, and by increase of resistance upon mold releasing. Demanding molding conditions:

An effective use of existing facilities not by changing design of apparatuses and molds but by improving a stamper structure and manufacturing methods has been sought. Molding resin (polycarbonate) for media was improved to achieve sufficient thermostability under a condition very close to thermal decomposition temperature (about 40° C.). This realized a reduction of mold clamping force. Although the mold clamping force of a 75 ton class (having a pressure per unit area of about 1000 kg/cm$^2$) was required over ten years ago, a 35 ton class is most commonly used now. However, the mold clamping force has begun to return to a 50 ton class due to expected rapid capacity increase or density increase. That is, effects of improvement of molding materials are being lost because of the capacity increase.

Background 3: Both the improvement of transfer property and improvement of optical property (reduction of birefringence caused by residual strain) are the difficult issues involved in a media injection molding process. As the control of the molding process inevitably becomes more difficult due to a trend of reduction of a filling space and rapid increase of pattern density, easily moldable stampers are desired for facilitating the process.

DISCLOSURE OF THE INVENTION

The present invention solves one or more of the above problems. More specifically, according to one aspect of the present invention, there is provided a thermally and mechanically continuous heat insulating stamper structure. Another aspect of the present invention provides a novel stamper structure thermally designed to offer a heat insulating function with a performance the same or better than related-art heat insulating stampers. The present invention also provides a stamper structure that lowers manufacturing energy consumption and reduces environmental loads by simplifying complicated processes including use of plural manufacturing machines.

Related-art heat insulating stamper structures do not have adhesion at an interface between a polymer layer and a Ni layer sufficient enough to endure a thermal cycle and a weight cycle. In view of an expected severe use environment due to a growing media capacity, there is provided in a further aspect of the present invention a novel stamper structure that has high durability while maintaining a heat insulating function.

In another aspect of the present invention, there is provided a heat insulating stamper having a novel structure that prevents occurrence of interfacial separation.

In still another aspect of the prevent invention, there is employed a composite plating layer comprising a metal matrix with particles dispersed therein to provide a thermally and mechanically continuous structure, thereby significantly prolonging a stamper life. This aspect is the basis of the present invention.

According to yet another aspect of the present invention, there is provided a heat insulating stamper with a pattern on a surface thereof for use in molding an optical disc substrate, comprising an uppermost section made of a metal material, a lowermost section made of the same material as the uppermost section, and a middle section having a heat conductivity lower than the uppermost section, wherein the middle section includes the same metal material as the uppermost section and the lowermost section, and heat insulating portions.

BEST MODE FOR CARRYING OUT THE INVENTION

First, problems with a related-art heat insulating stamper are described referring to reasons why the related-art heat insulating stamper has a lower mechanical strength than a simple metallic Ni stamper.

Figure 1:
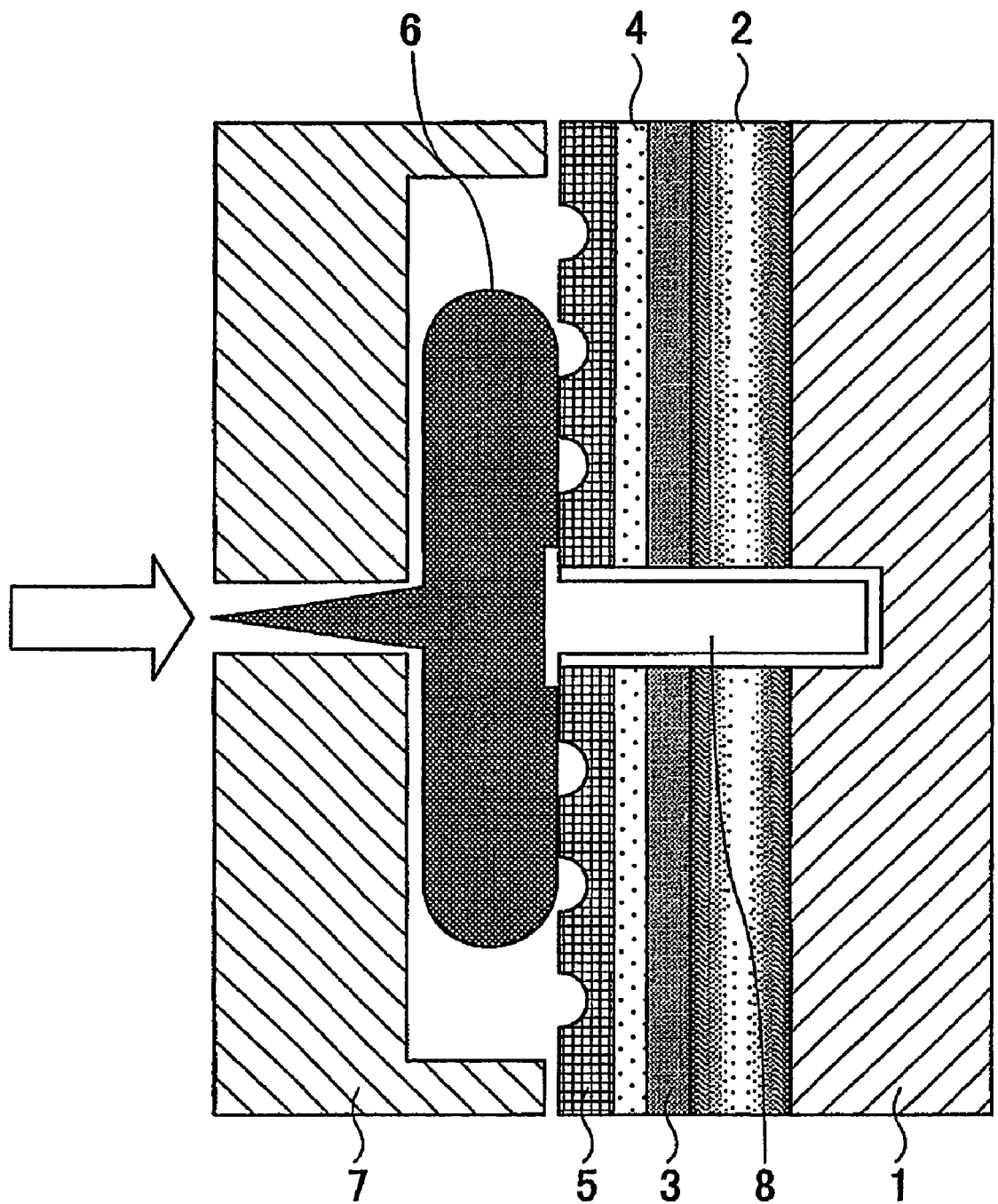
FIG. 1 shows a related-art heat insulating stamper for illustrating a process of manufacturing a medium.

Initial quality: With reference to FIG. 1, a related-art heat insulating stamper has a four-layer structure comprising a secondary plating layer 2, a stamper conductive film 3, a heat insulating resin layer 4, and a primary plating layer 5. The resin layer 4 is exposed at an inner edge and an outer peripheral edge of the stamper. This structure is finished by shearing with use of a fine blanking press machine so as to have a predetermined size and a position accuracy corresponding to a pattern. Generally, a sandwich structure comprising a hard layer, a soft layer, and another hard layer having different Young's modulus from each other often becomes uneven by shearing.

In this case, the resin layer 4 is slightly recessed. Such a flange form causes a stress concentration of external pressure, and is likely to serve as a start point of a separation. In fact, in production sites, a heat insulating stamper of this type especially requires smooth attachment and removal of an inner holder to/from a stamper mounting mold.

This is a major factor that affects an initial stamper life.

Deterioration over time: A stamper or a cavity surface of a mold is exposed to a severe use condition in an injection molding process. A heat cycle is repeated in which the stamper is quickly heated by a contact with a molten resin of about 300 C.° and then cooled to about 200 C.°. In addition, application and removal of a resin pressure are repeated, and the pressure reaches about 1000 kg/cm$^2$ although for an instant.

A sliding stress due to a thermal expansion difference and a pressure cycle is naturally generated at an interface between a polymer layer provided for exerting a heat insulating effect and a Ni layer, so that thermal and mechanical fatigue is accumulated and finally resulted in an interfacial separation.

This problem is unavoidable as long as the stamper has a discontinuous structure of Ni-polymer-Ni.

The following describes problems of deterioration over time in media production using the related-art heat insulating stamper with reference to FIG. 1.

In FIG. 1, a movable mold is denoted by the reference number 1; the secondary plating layer is denoted by 2, the stamper conductive film is denoted by 3, the stamper heat insulating resin layer is denoted by 4, the primary plating layer is denoted by 5, a molten molding resin is denoted by 6; a stationary mold is denoted by 7; and an inner holder is denoted by 8. This related-art stamper includes two interfaces where different materials meet, which are an interface A (a contact face between the stamper conductive film 3 and the stamper heat insulating resin layer 4) and an interface B (a contact face between the stamper heat insulating resin layer 4 and the primary plating layer 5). On both of the interfaces A and B, a metallic Ni is in contact with, for example, a polyimide resin.

When the molten molding resin 6 heated to 300° C. or higher is injected into a cavity, the primary plating layer 5, which has a thickness as thin as 30 μm and therefore has a small heat capacity, is quickly heated by a heat energy absorbed from the molten molding resin 6. The heat is also transferred to the stamper heat insulating resin layer 4 through the interface B.

Table 1 shows a property comparison.

TABLE 1

|  | Ni | Polyimide | Teflon (TM) |
|---|---|---|---|
| linear expansion coefficient (10$^{-5}$/° C.) | 1.3 | 5.4 | 10 |
| specific heat (cal/g) | 0.12 | 0.27 | 0.25 |
| thermal conductivity (cal/cms ° C.) | 130 * 10$^{-4}$ | 9.4 * 10$^{-4}$ | 6.0 * 10$^{-4}$ |

As shown in Table 1, Ni and resins have very different thermal properties. The linear expansion coefficient of the resins is 5-10 times higher than Ni. This is the cause of in-plane shearing stress generated at the interfaces. Although the related-art heat insulating stamper is developed to effectively utilize a difference of the thermal conductivity, the stamper may suffer from fatal defects, i.e., interfacial separation in production sites. In order to overcome this problem, the following countermeasures may be taken.

(A) Cure under an incomplete curing condition (in a temperature range lower than 200° C.) so as to impart a rotational capacity to molecular chain segments of the resin, thereby maintaining adhesion.

(B) Perform reverse sputtering with, for example, Ar ion to the contact face between the stamper conductive film 3 and the stamper heat insulating resin layer 4 so as to roughen the face and create an anchor effect, thereby improving adhesion.

On the other hand, it has been found that the resin itself deteriorates over time as the resin repeats expansion and shrinkage due to a pressure repeatedly generated inside the cavity and a temperature change.

That is, these countermeasures are not complete solutions, and quality and reliability problems have remained unsolved.

In the above description, the reason why the related-art heat insulating stamper has a lower mechanical strength than a simple metallic Ni stamper is explained with reference to FIG. 1.

Figure 2:
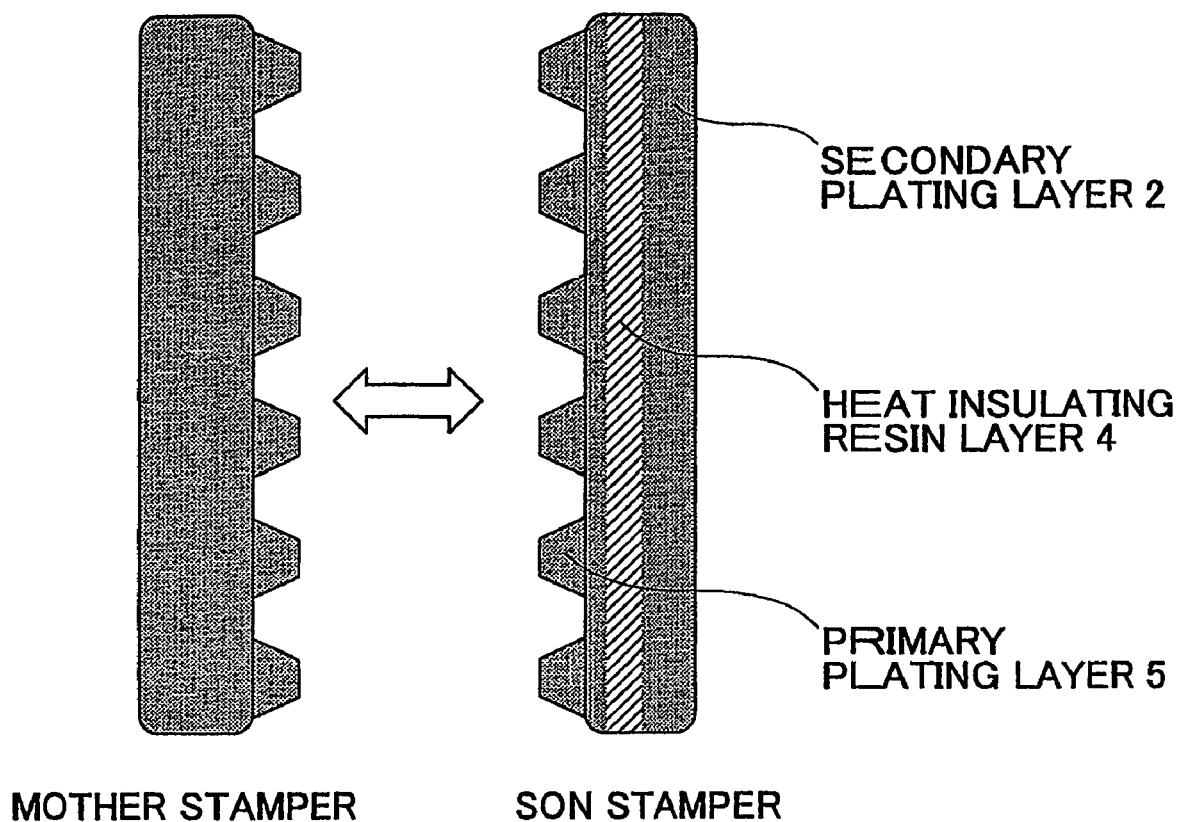
FIG. 2 shows a related-art heat insulating stamper structure for illustrating constraint conditions and resulting negative effects.

The following describes constraint conditions and resulting effects in production of the related-art heat insulating stamper structure with reference to FIG. 2.

(a) Only a son stamper duplicated from a mother stamper is available for use.

It is required to apply a polyamic acid coating and cure in a reactor at 150-200° C. so as to obtain a thermosetting imide resin. It is not preferable to form a heat insulating layer on a master stamper produced using a glass master. This is because a patterned resist layer significantly is known to change in property under the above-described curing condition and becomes difficult to be removed.

Therefore, application to the master is basically impossible or extremely difficult (a mother stamper is produced from the master stamper, and then a son stamper is duplicated from the mother stamper).

(b) The primary plating layer 5 needs to be thick because the heat insulating resin layer 4 is mechanically and thermally weaker than metal.

Patent document 4 discloses a preferable thickness of a heat insulating layer. In view of the reduction of molding process time, it is preferable to reduce the thickness of the primary plating layer 5 so as to lower the heat capacity, thereby quickly raising the surface temperature and maintaining the resin temperature as high as possible until the pattern transfer is completed.

However, since the related-art heat insulating stamper employs a soft simple resin layer as the heat insulating layer 4, the primary plating layer 5 needs to have a thickness of 30 μm or greater, which exceeds a thickness required in a functional aspect for achieving sufficient surface strength.

According to an embodiment of the present invention, a heat insulating layer includes a metallic Ni matrix with heat resisting resin particles dispersed therein. This configuration not only solves the strength problem, but also eliminates the need for the high temperature curing. Accordingly, flexibility in production process is remarkably enhanced. Production of the related-art heat insulating stamper includes an energy consuming and time consuming process, i.e., a process of producing a master stamper and a mother stamper (the mother stamper has the same pattern as the master and son stampers but indented oppositely).

On the other hand, the present invention provides a structure applicable to both the mother stamper and the son stamper.

Figure 6:
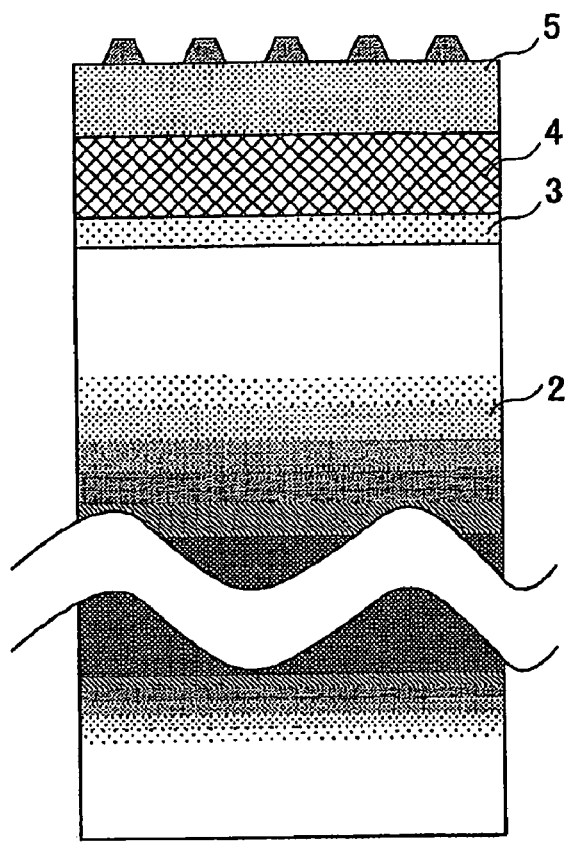
FIG. 6 is a cross-sectional view illustrating a related-art heat insulating stamper structure.

FIG. 6 is a cross-sectional view illustrating a related-art heat insulating stamper structure. The related-art heat insulating stamper structure comprises at least four layers, which are a primary plating layer 5, a polyimide layer 4, a conductive layer 3, a secondary plating layer 2 (a thick plating). In contrast, as shown in FIG. 7, an example of the present invention comprises a primary plating layer 5, a composite material layer 9, and a secondary plating layer 2 (a thick plating).

Figure 7:
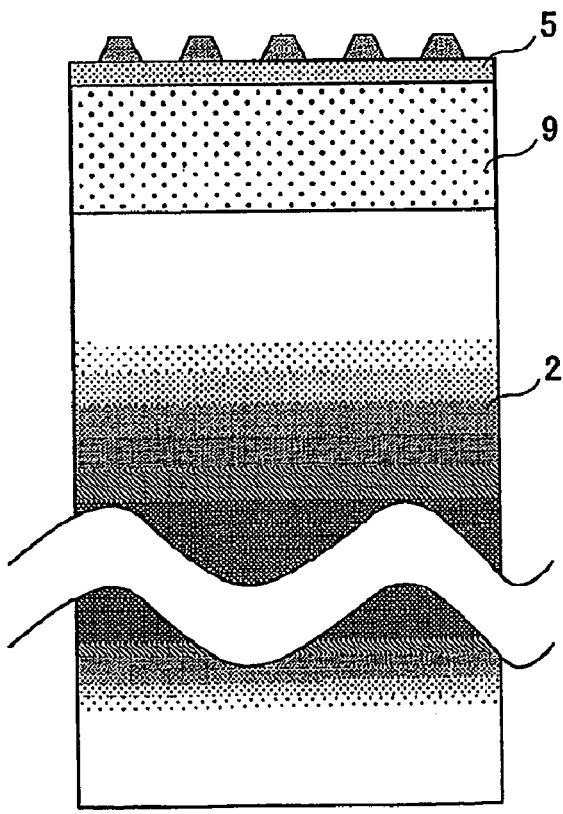
FIG. 7 is a cross-sectional view illustrating a heat insulating stamper structure of the present invention.

With reference to FIG. 7, it is preferable to have a middle section in which heat insulating portions are combined with a metal material. Preferably, either the heat insulating portions or the metal material (the heat insulating portions in this example) is dispersed in a continuous matrix of the other (an Ni phase in this example). The heat insulating portions in this example include a heat insulating material, and are formed in a plating bath being lightly stirred according to an ordinary plating method, although the production method is not limited thereto. The heat insulating portions may be defined by minute voids present in the metal material of the middle section. Such minute voids may be, for example, bubbles that are generated near a cathode in the plating bath during the plating process. The minute voids may alternatively be part of a honeycomb structure that is formed after melting out low melting point metal wire embedded in, for example, a nickel base.

If the middle section of the heat insulating stamper of the present invention is in a form of a layer, it is possible to fully exert desired capability and achieve high flexibility by designing and controlling average heat conductivity of the middle section rather than by focusing on the thickness of the layer from the standpoint of a molding cycle of a substrate.

The heat insulating portions in the middle section of the heat insulating stamper of the present invention have an average particle diameter of 50 μm or less, preferably 0.05 μm-5 μm.

The concentration of the heat insulating portions in the middle section of the heat insulating stamper of the present invention is preferably 50 parts or less per 100 parts by volume of the metal material although the ratio may vary depending on a difference of Young's modulus with the metal matrix, for example, a Ni matrix. If the heat insulating portions are made of an organic material, the concentration of the heat insulating portions is preferably 40 parts or less. Too many heat insulating portions made of an organic material might lower the mechanical strength. If the heat insulating portions are made of an inorganic material, the ratio may be 50% by volume or less. The inorganic material may preferably be a material that does not inhibit Ni—Ni—Ni binding.

In the case of a plating bath, heat insulating particle material suspended therein is used for plating (although not limited to this formation method in this invention). Because $1/1.2$-$1/20$, typically $1/2$-$1/10$, of the abundance of heat insulating particles in the plating bath are absorbed into a plating film, it is preferable to have a sufficiently high abundance of heat insulating particles in the plating bath. Accordingly, it is also preferable to lightly stir the bath but to prevent, for example, aggregation and precipitation of the suspended particles.

The size and the concentration of the heat insulating portions in a plating film of a resulting plating sample and the middle section of the plating film can be measured in the following manner. The thickness of the plating film is measured by fluorescent X-ray analysis. As for the heat insulating portions in the middle section of the plating film, a Hull Cell™ test brass plate for a Hull Cell™ tester is cut at three different points by ultramicrotomy using a diamond knife, and the cross section of a plating membrane is photographed by a SEM (scanning electron microscope). The plating membrane on the brass plate is masked by copper sulfate plating, cut by a cutter, and embedded and cured in a resin. A face to be photographed is polished (finished using alumina of 0.1 μm in this example). Then, the membrane is etched (for example, ion etching; BAL-TEC RES100), coated with a platinum thin layer by sputtering, and photographed by the SEM. If a TEM is used, the cross section of an ultrathin section of several hundred angstroms is subjected to an osmium tetroxide treatment (staining treatment) in place of platinum thin layer coating, and photographed by the TEM (for example, Hitachi H-9000UHR, 3000 kV). In addition to the above methods, FTIR infrared microscopy, raman spectroscopy, XPS (X-ray photoelectron spectroscopy), secondary ion mass spectrometry, or a surface analysis method using a STEM may also be suitable. If the heat insulating portions are made of the heat insulating particle material, the concentration may be measured by melting metal portion of the plating film by the use of acid, and collecting and measuring residual heat insulating particles.

Figure 9:
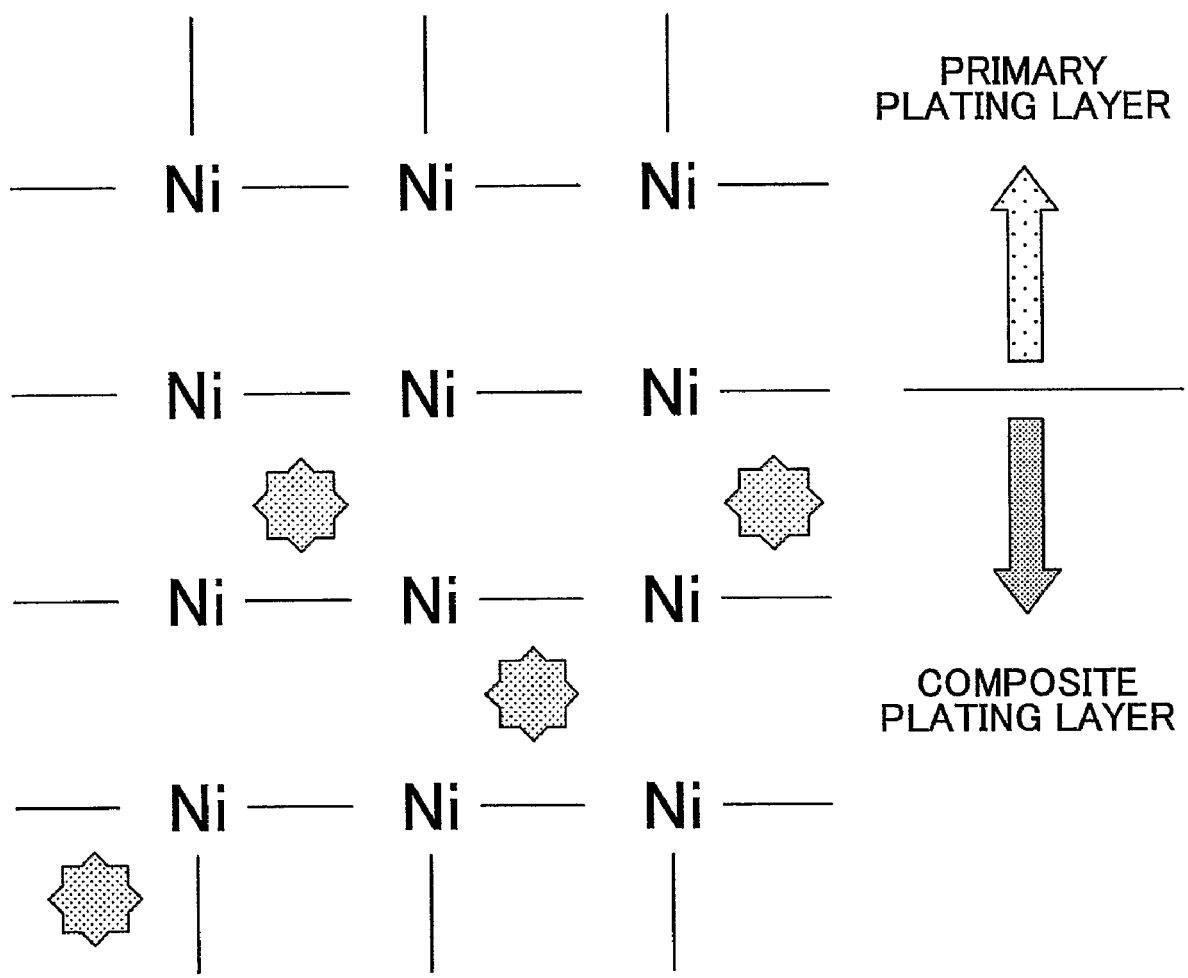
FIG. 9 is a schematic diagram illustrating a state of an interface according to the present invention.

Referring to FIG. 9, both the primary plating layer 5 and the composite material layer 9 includes a metallic Ni matrix according to the present invention. There is no physical interface between the primary plating layer 5 and the composite material layer 9.

The heat resisting particles are dispersed within the Ni—Ni—Ni continuous matrix at a specific volume fraction.

That is, the mechanical property is continuous, and the thermal property is controlled in the thickness direction. Unlike the related-art heat insulating stamper, it is possible to eliminate the interface between the Ni layer and the polymer layer while maintaining the heat insulating performance.

The heat resisting particles used in this example of the present invention are selected to have a heat resistance of 200 C.° or higher, a particle diameter of 0.1 μm-5 μm, and a heat conductivity of 1-50 W/(m·K). For example, particles of fluorinated resin (PTFE: polytetrafluoroethylene, PFA: perfluoroalkoxy resin, ETFE: tetrafluoretilen, PVDF: polyvinylidene fluoride), aromatic polyimide particles, aromatic polyamide particles, and silicon resin particles are suitable.

As the heat resisting inorganic material, zirconia series, alumina series, silicon carbide series, and silicon nitride series are suitable.

Further, the inorganic particles provide a ferromagnetic field producing mechanism in addition to a usual electric field producing mechanism, which has been found to be effective for supporting electrodeposition.

EMBODIMENT

First Embodiment

Structure and Example of Layer Specification

FIG. 7: Since the stamper of the present invention comprises mainly metallic Ni, the strength problem is solved.

Accordingly, the primary plating layer 5 may be made very thin so as to reduce the heat capacity and increase temperature rising speed.

The thickness of the composite Ni plating layer 9 of FIG. 7 may be determined based on the heat conductivity.

Ni has a heat conductivity 10 or more times higher than the resins (Teflon™, polyamide). That is, when the plating layer 5 of the present invention has a thickness of 1/10 times of that of the related-art plating layer 5, the composite material heat insulating layer of the present invention offers the same performance as the related-art heat insulating layer. Moreover, the reduction of the thickness of the primary plating layer 5 can reduce the production time.

The primary plating layer 5 of the present invention shown in FIG. 7 may be made much thinner than the related-art primary plating layer 5 of FIG. 6.

Figure 13:
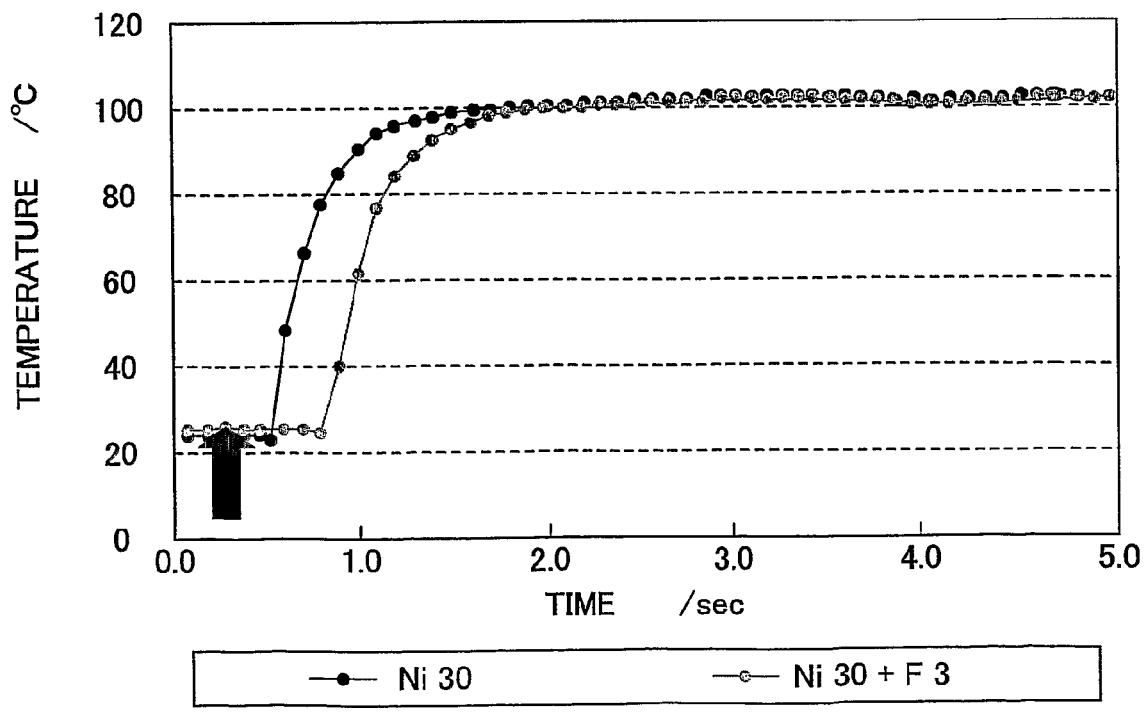
FIG. 13 is a chart showing a temperature change of a Teflon™ dispersed plating layer.

FIG. 13 shows temperature changes of two samples measured by a thermocouple thermometer according to the first embodiment. The samples are a Ni foil (Ni thickness 30 μm) formed on a hot plate maintained at 100° C., and a Ni foil formed in the same manner but having a composite plating (Teflon™ eutectoid plating 3 μm) on the backside.

In the graph in FIG. 13, the right curve that rises with a delay shows the behavior of the composite plating intended in the present invention. It was found that the insulation efficiency is improved due to the presence of the composite plating having a thickness of only 3 μm.

Similar experiments were repeatedly conducted. Based on the results of these experiments, the following molding conditions were determined to be applicable in this embodiment of the present invention: the resin volume fraction of the composite plating is 25%; the thickness of the primary plating layer is 3 μm; the thickness of the composite Ni plating layer 8 is 35 μm; and the total thickness of the stamper is 300 μm. The content ratio of Teflon™ particles in the plating bath in this example was 30%.

Figure 3:
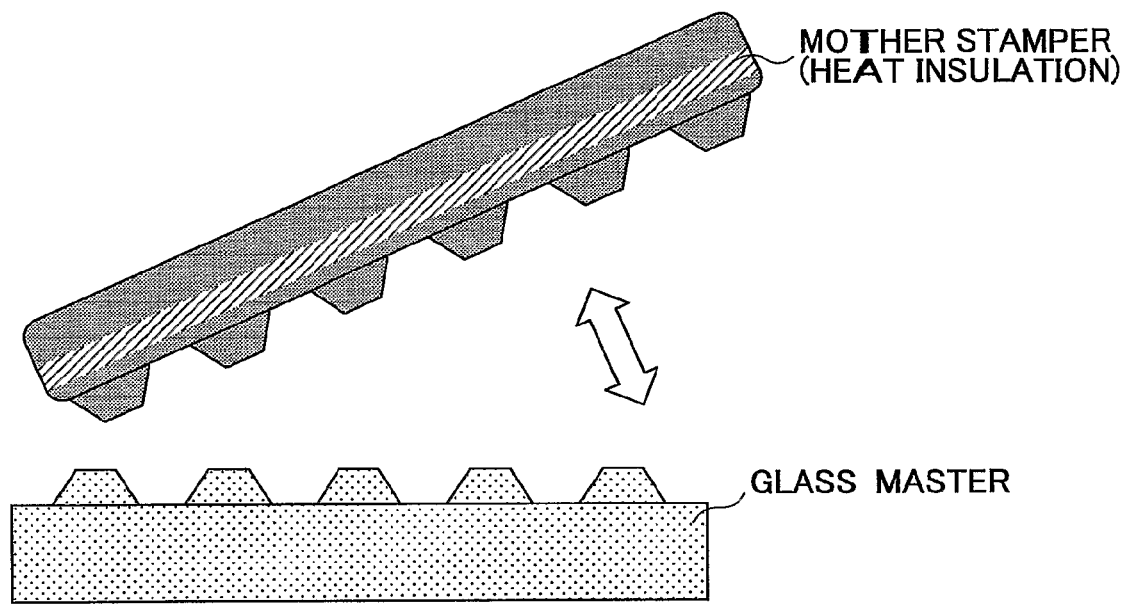
FIG. 3 is a schematic diagram showing an embodiment of the present invention.
Figure 4:
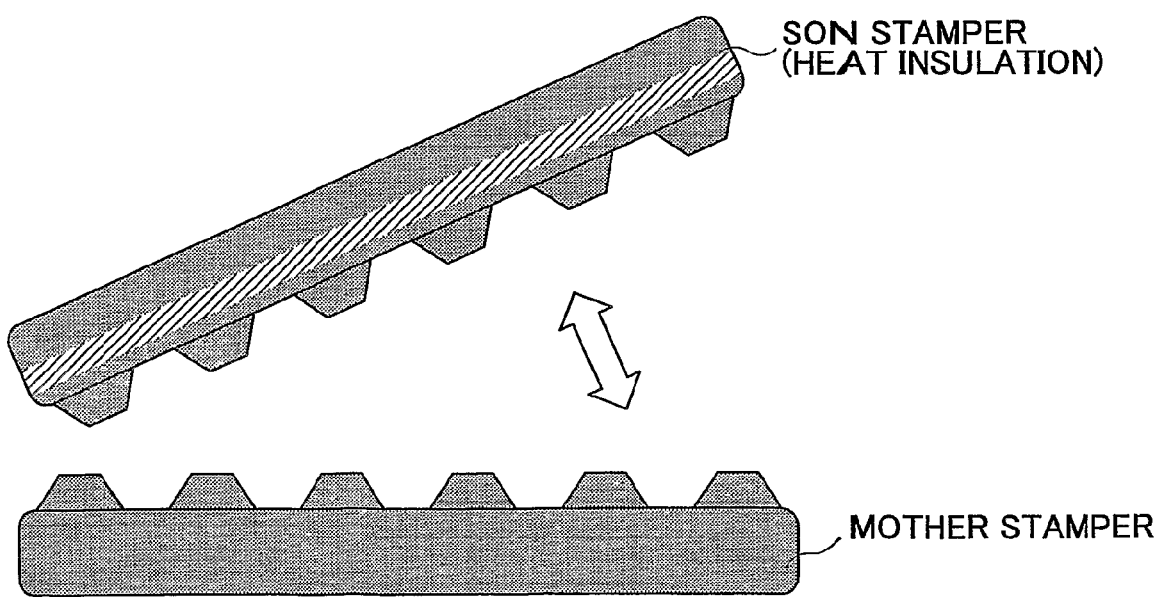
FIG. 4 is a schematic diagram showing an embodiment of the present invention.

FIGS. 3 and 4 show schematic diagrams of this embodiment.

While the molding durability of the related-art heat insulating stamper varies 2,000-40,000 times of stamping, the heat insulating stamper of this embodiment stably endures 100,000 times of stamping.

Figure 5:
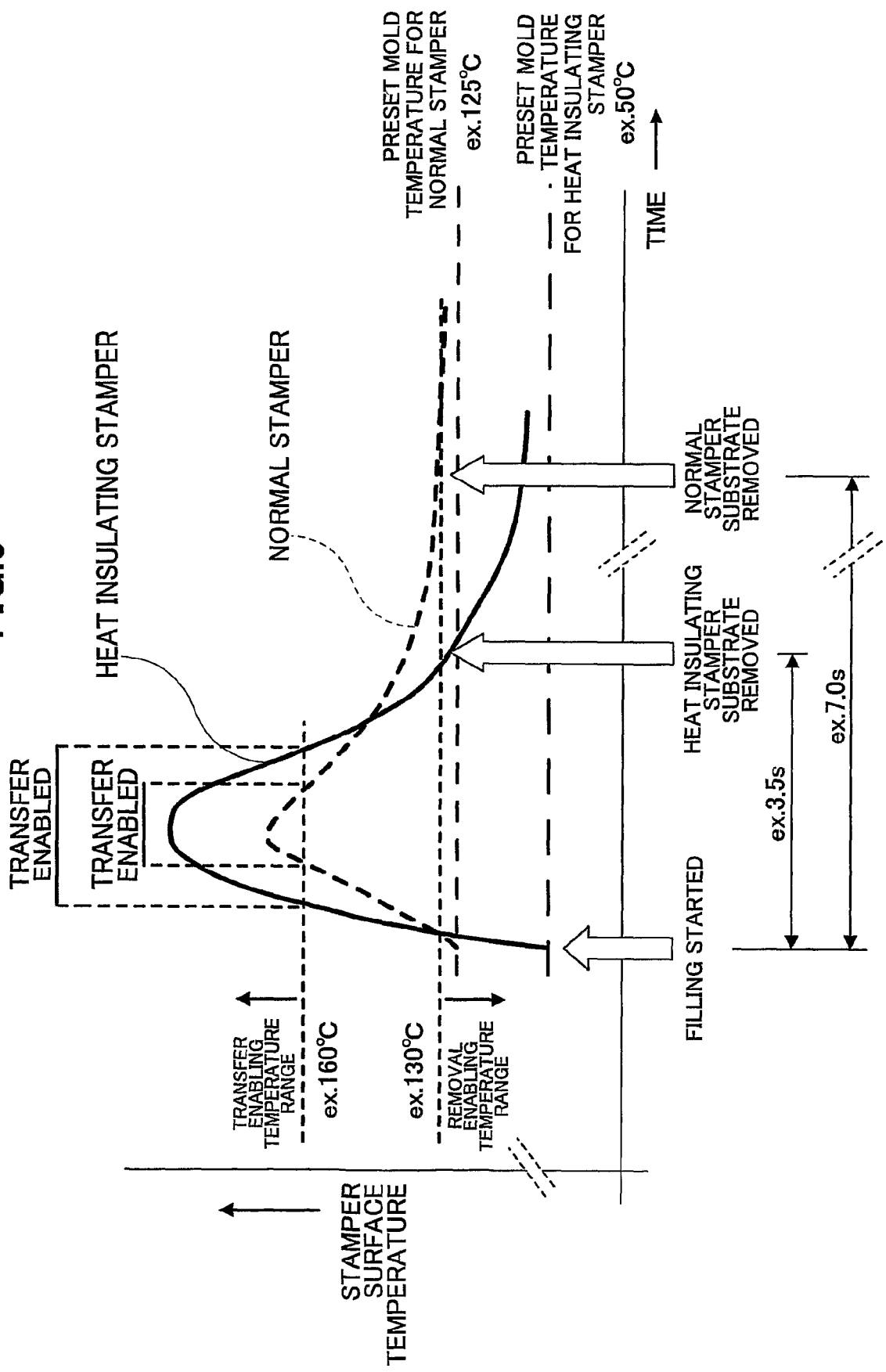
FIG. 5 is a conceptual graph showing a temperature change inside a mold.

The following describes advantages of the stamper of this embodiment with reference to FIG. 5 from the aspect of thermal behavior.

FIG. 5 is a conceptual graph showing a temperature change inside a mold.

The surface temperature of the mold, i.e., the stamper, rises upon filling the molten resin. The molten resin serves as a heat source. The molten resin transfers the heat thereof to the mold to raise the surface temperature of the mold. With this heat transfer, the temperature of the molten resin drops. Usually, the viscosity of the molten resin lowers along with a temperature rise, so that the pattern transfer ability is improved. When the temperature drops, the viscosity typically increases, making the pattern transfer more difficult. In the graph of FIG. 5, "transfer enabling temperature range" indicates the minimum temperature required for pattern transfer (e.g., 160° C. for polycarbonate resin) and above the minimum temperature.

As can be understood from the graph of FIG. 5, a "normal stamper" has a lower maximum temperature and a shorter duration of the transfer enabling temperature range than the "heat insulating stamper". This is because the area of the normal stamper to be heated by being in contact with the molten resin differs from the area of the heat insulating stamper to be heated. More specifically, as the normal stamper has no thermal barrier thereinside, the normal stamper is heated together with the mold. On the other hand, as the heat insulating stamper has an insulating layer thereinside that serves as a thermal barrier, only a thin "primary plating layer" (e.g. a few dozen μm thickness) is heated. As will be appreciated from FIG. 5, there is a difference in the heat capacity between the normal stamper and the heat insulating stamper is obvious. The difference in the heat capacity of the area to be heated appears as the difference in the maximum temperature and the duration of the transfer enabling temperature range. The pattern transfer is affected by the surface temperature of the stamper and the duration of the temperature. In this sense, the maximum temperature and the duration of the "transfer enabling temperature range" of the heat insulating stamper are advantageous.

Generally, it is possible to increase the maximum temperature and the duration of the transfer enabling temperature range of the normal stamper by increasing a preset mold temperature. If so, however, a mechanical property or flatness of a substrate may be lowered as described below in greater detail.

Upon removal of the substrate, the surface temperature of the mold is preferably in a "removal enabling temperature range" (e.g. 130° C. or lower) in order to give rigidity to the substrate. Even a resin substrate having a sufficient elastic deformability at room temperature might be subjected to plastic deformation at a high temperature by application of a small external force. Since the substrate is typically used as an information recording medium, the substrate is preferably as flat as possible. That is, the "removal enabling temperature range" indicates a temperature range of the mold surface most preferable for giving the resin substrate a capacity to resist external force.

As shown in the graph of FIG. 5, the preset mold temperature of the heat insulating stamper is different from that of the normal stamper. The heat insulating stamper can temporarily stop the drop of the temperature of the stamper surface by a heat insulating effect thereof, and therefore the preset mold temperature of the heat insulating stamper can be set lower than that of the normal stamper. Lowering the preset mold temperature makes the removal of the substrate easier.

In the normal stamper, the preset mold temperature is near the upper limit of the removal enabling tempera range so as to improve the pattern transfer. With this setting, since the preset mold temperature is near the "removal enabling temperature range", it takes a longer time to reach the "removal enabling temperature range". Although it is desired to set higher than the lower limit of the "transfer enabling temperature range", such a setting may prevent the substrate from having a sufficient rigidity and may cause plastic deformation at the time of removal, which may result in lowering the flatness.

In contrast, in the heat insulating stamper, since the preset mold temperature can be set to a temperature sufficiently lower than the "removal enabling temperature" due to the heat insulating effect thereof, the temperature quickly drops to the "removal enabling area" after completion of heat insulating effect (see FIG. 5). Therefore, the substrate can be removed earlier compared to the normal stamper.

As describe above, the surface temperature of the mold (stamper) is preferably in contrary states so as to have a high pattern transfer capability and a high flatness. Molding techniques have been improved in order to achieve both the high transfer capability and the high flatness. If the molding cycle is ignored, "heat cycle molding" is ideal wherein heating steam (e.g. about 200° C.) and cool water (e.g. about 25° C.) are supplied into a mold when necessary or desired as with the case of press molding of conventional analog records. The heat insulating stamper has an ideal structure that realizes this "heat cycle molding" without using expensive temperature control equipment and enables molding in a short cycle that cannot be achieved by the conventional "heat cycle molding".

According to another aspect of the present invention, the thickness reduction of the primary plating layer still derives effects of the related-art heat insulating stamper.

The thickness of the individual layers of related-art heat insulating stamper is determined based on the time taken by the primary plating layer 5 to reach a predetermined surface temperature (about 300° C. or higher) of and the time taken by cooling to be ready for mold release. In the thermal behavior, it is preferable that the temperature quickly rise, stay at a high temperature level in a resin filling and pattern transfer step, and then quickly drop to a removal temperature (about 120° C.). If such a behavior is realized, desirable pattern transfer capability and optical property may be achieved.

Since the related-art heat insulating stamper includes the insulating layer 4 made of an organic material such as polyimide, the mechanical strength in a hot environment is much lower than an inorganic material. Therefore, it is necessary to set a lower limit of the thickness of the primary plating layer 5. At least a 30 μm thickness is required. In future, the mold clamping force inevitably increases due to increasing media capacity, and therefore the primary plating layer 5 of the related-art stamper structure should be thicker.

Moreover, it is known that bubbles and foreign substances within the heat insulating layer 4 directly affect the primary plating layer 5. Usually, small bumps and dents of a medium are considered as local defects in the optical property. In a system that forms a heat insulating layer with a spin coat method, problems such as small gas formation and residue due to materials and uneven thickness due to a process environment often occur.

A surface roughening process by ion sputtering is preferably performed before forming the conductive film 3. An undesirable effect is that a brittle layer called WBL (Weak Boundary Layer) may be formed on the resin surface, if conditions vary, and may induce interfacial separation during use.

As described above, the related-art heat insulating stamper needs to meet various detailed constraint conditions because of its lamination structure of different materials.

In contrast, according to the present invention, a plating method is used the process, and the heat insulating stamper of this embodiment is free from such constraint requirements. Further more, a significant improvement is achieved in terms of defects issues.

Second Embodiment

Example of Insulating Layer Formation (PTFE and Polyimide Dispersion Electroplating)

The following is an electroplating bath composition used in this embodiment.

sulfamic acid Ni solution (1 mol/L), Ni chloride solution (0.2 mol/L), fluoboric acid (0.5 mol/L)

sulfamic acid Ni (280 g/L), Ni chloride (45 g/L), fluoboric acid (40 g/L): Watt bath PTFE or polyimide particles of a particle diameter of 10-500 nm (10-40 g/L) are added together with dispersion aid and stirred, and pre-plating is performed for initial make-up of electrolytic bath.

The temperature of the bathing fluid may be set to within a range of 55° C. through room temperature, preferably to 40° C. If the temperature is too high, cracking may occur in a plating film.

A master stamper subjected to a separation film treatment is opposed by a Ni anode such that a Ni conductive film is formed on the master stamper by sputtering of 800 Å or electroless plating. Then an anode with Ni pellets is opposed by a cathode.

Electroforming is performed at a carrying current density preferably of 500-1,000 A/m$^2$. If the current density is too high, the content of the heat insulating particles in the plating film becomes too low.

Electroplating: Since PTFE (Teflon™) and polyimide particles do not have surface charge, the particles needs to be charged by a surface active agent. Since metal ion in the plating solution is positive, the dispersed particles are positively charged. The surface active agent used in the composite plating may include a cationic surface active agent and an amphoteric surface active agent that becomes cationic in a PH range in use.

Third Embodiment 3

Example of Simplification of Entire Process

Figure 8:
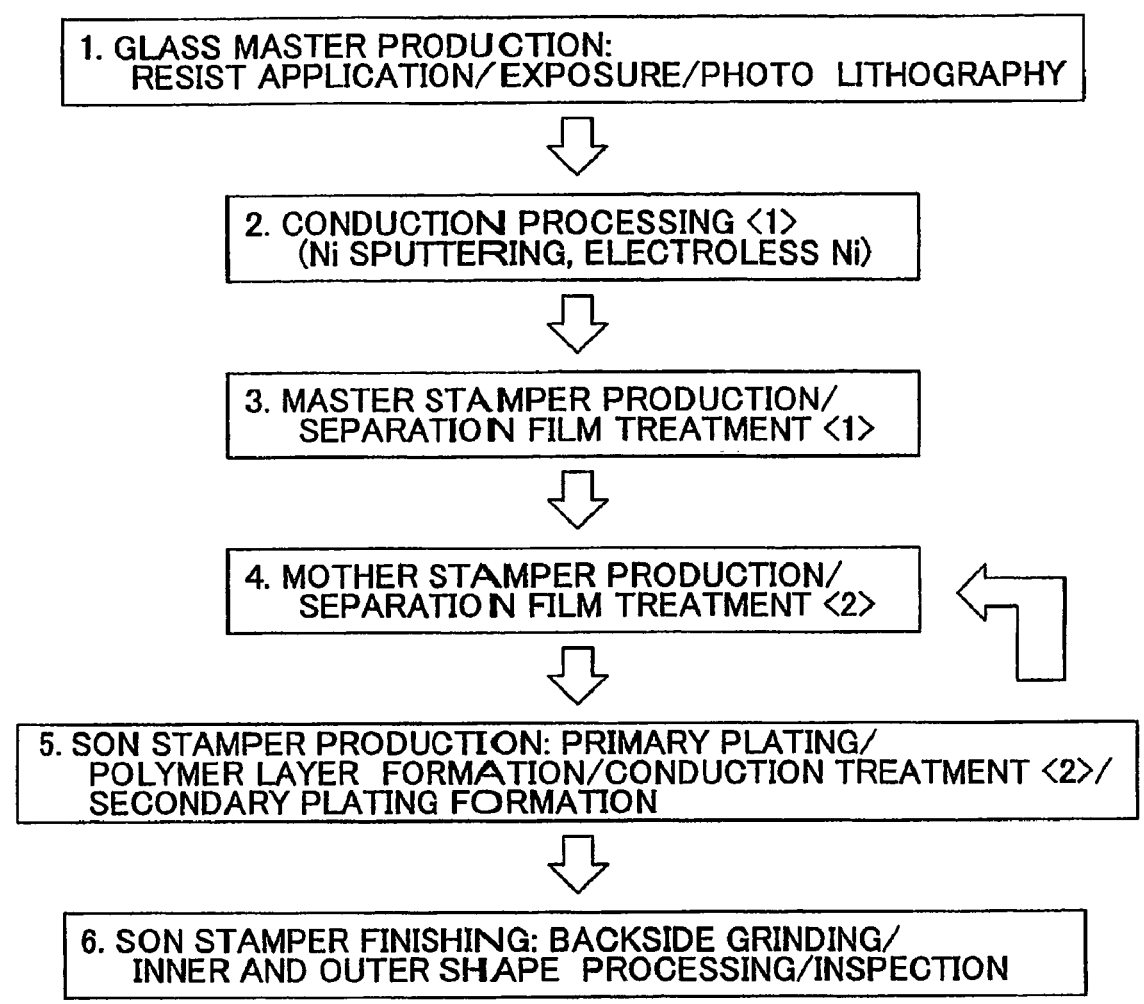
FIG. 8 is a flowchart showing a manufacturing process of a related-art heat insulating stamper.

FIG. 8 shows a process flow disclosed in Patent Document 5.

In the process flow, a step "5. son stamper production: primary plating/polymer layer formation/conduction processing <2>/secondary plating formation" is related to a related-art heat insulating son stamper.

Manufacturing machines used in this step are an electroforming apparatus (cleaning/drying), a resin blender, a spinner (resin application), a high-temperature reactor (resin curing), an etch apparatus (surface roughening), a sputtering apparatus (conductive film formation), and an electroforming apparatus.

On the other hand, the present invention only uses a first electroforming apparatus 1 (Ni plating bath) and a second electroforming apparatus 2 (composite dispersion plating bath). Consequently, the energy consumption is reduced by about 50%.

The same may apply to steps "3. master stamper production" and "4. mother stamper production" shown in FIG. 8.

Further, since the heat-insulating stamper of the present invention has continuous mechanical strength, inner and outer shape can be processed by press blanking method without trouble in the final step "6. son stamper finishing: backside grinding/inner and outer shape processing/inspection". While the related-art heat insulating stamper often suffers unevenness and separation at the edge thereof, concerns over such problems are eliminated in this invention.

Fourth Embodiment

Example of Particles Dispersed with a Gradient of Concentration

FIGS. 10A-12 show a modified embodiment of the present invention.

Figure 10A:
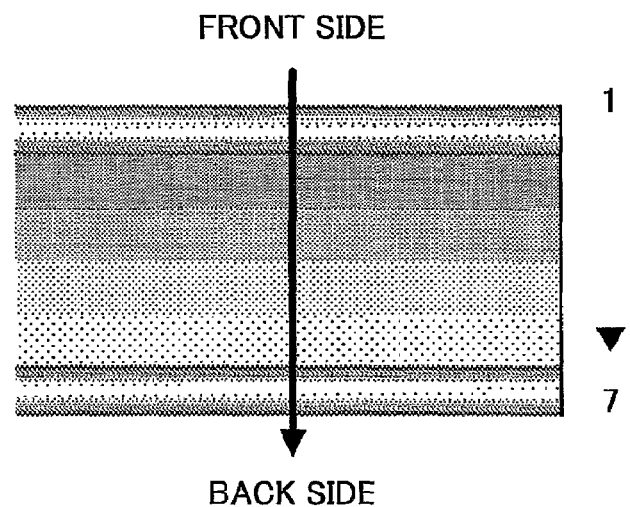
FIG. 10A shows a gradient of particle concentration according to a fourth embodiment of the present invention.
Figure 10B:
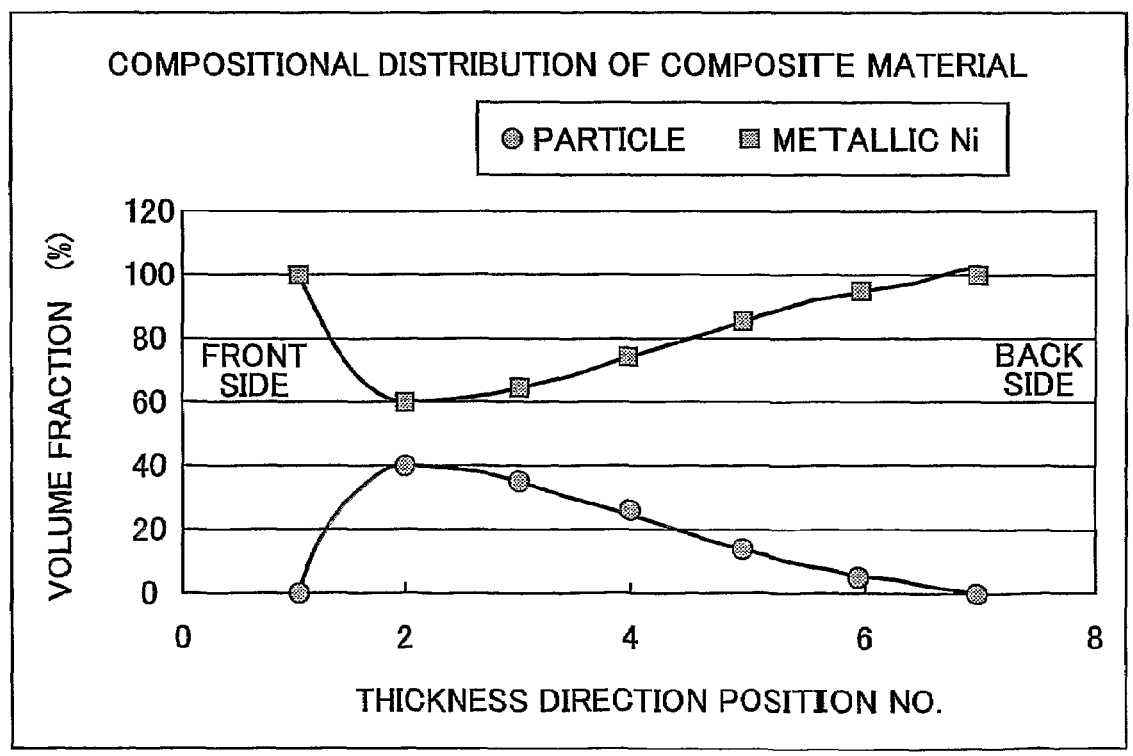
FIG. 10B is a graph showing a compositional distribution according to the fourth embodiment of the present invention.

A graph shown in FIG. 10B plots a gradient of particle concentration (volume fraction %) between a front surface of a heat insulating stamper (surface in contact with a molding resin) and a back surface (surface in contact with a stationary mold). According to a fifth embodiment, the concentration of particles is high in a region directly below a primary plating layer, and gradually lowers toward the back surface such that only Ni exists on the back surface. This embodiment is modified in order to simplify and to perform more continuously a process of transporting a workpiece between different plating apparatuses and between different plating baths in a composite plating process.

Figure 11:
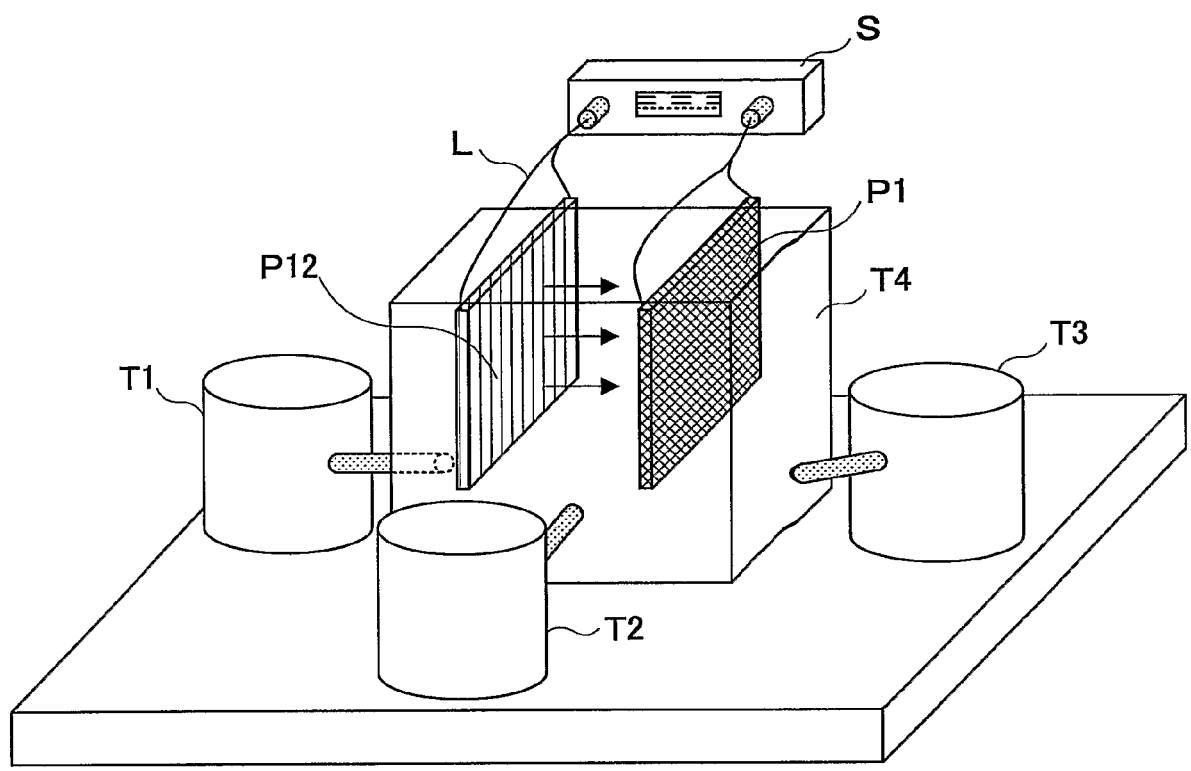
FIG. 11 is a schematic diagram illustrating a composite plating apparatus according to the present invention.
Figure 12:
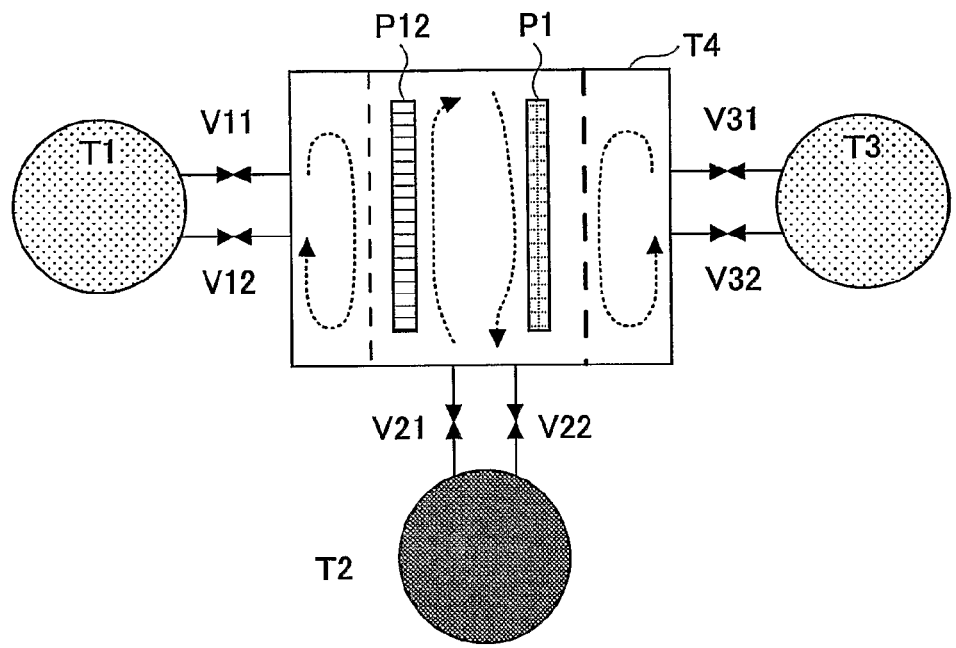
FIG. 12 is a schematic diagram illustrating a flow channel of a composite plating solution according to the present invention.

The following describes this embodiment, which comprises a commercially available composite plating apparatus with a new mechanism added, with reference to FIGS. 11 and 12.

FIG. 11: Three tanks T1, T2, and T3 are connected to a composite plating tank T4. Sulfamic acid Ni electroforming solution is stored in the tanks T1 and T3. Heat resisting particles are dispersed at a predetermined concentration, stirred, and mixed in the tank T2. In FIG. 11, a workpiece electrode is denoted by P12, and an anode bag electrode with Ni pellets is denoted by P1. A potential gradient is formed between the opposing electrodes P12 and P1 by a power supply S. Ni ion and the particles are successively deposited on a surface of the workpiece along with an electric force line. The amount of particles to be absorbed into a composite film is controlled by current density control.

According to this embodiment, a current density of 4 A/dm$^2$ is the maximum point. Plating is started at a current density of 1 A/dm$^2$ (Step 1), and 10 seconds later the deposition is started at 4 A/dm$^2$ (Step 2). About 30 minutes later, the current density is increased to 6 A/dm$^2$ and further to 10 A/dm$^2$ to form a Ni thick plating (Step 3).

Operations of the tanks and flow of plating solutions in Steps 1-3 are described below with reference to FIG. 12.

In Step 1, valves V11, V12, V31, and V32 are opened, and valves V21 and V22 are closed. The sulfamic acid Ni electroforming solution is introduced from the tanks T1 and T3 so as to form a pure Ni film.

In Step 2, the valves V11, V12, V31, and V32 are slightly closed, and valves V21 and V22 are opened. A region between the electrodes P12 and P1 in the tank T4 is filled with particle dispersion liquid to promote composite plating. When a desired thickness and concentration are obtained, the injection valve V21 is closed (Step 3). Then the flow rate of the discharge valve V22 is increased so as to lower the concentration of the particles in the region between the electrodes P12 and P1.

As shown in FIG. 12 (top view of the apparatus), two partition walls (indicated by dashed lines) are provided in the tank T4. A number of series of through nano-pores are formed in each of the partition walls. The partition walls allow Ni ion to pass therethrough but not particles having a diameter of 100 nm or greater, thereby preventing the particles from flowing into the tanks T1 and T3.

The tank T2 is provided with a laser particle counter to monitor the particle concentration. The tank T2 supplies high-concentration particle dispersion liquid in accordance with the consumption of the particles so as to maintain a predetermined particle concentration.

According to the above-described embodiments of the present invention, the following advantages are obtained.

The applicant of this invention has filed about more than 10 applications related to the above-described related-art heat insulating stamper. According to theses applications, a heat insulating layer is formed by a simple polyimide film. All the heat insulating stampers disclosed in the applications have a problem that a surface energy on a Ni/polyimide interface is unstable. In the present invention, composite materials, such as Ni and polyimide, (formed by electroplating or electroless plating) are used as an insulating layer. This is a novel structure in that a discontinuous interface is not formed.

According to the present invention, the quality is ensured due to continuity of the manufacturing process, and elimination of complicated processes and associated problems (formation of a thick polymer layer, and defects and incomplete baking due to the thickness, surface quality improvement process, lot-to-lot variation of resin agent, temperature and humidity control). Also, durability inspection before shipment may be omitted.

The flexibility of the manufacturing process is enhanced. More specifically, adjustments to a molding process may be made by changing the thickness of the insulating layer. Since the primary plating layer may be made thinner, the production time is reduced.

Moreover, environmental loads are significantly reduced. For example, baking, sputtering and etching processes are eliminated, and therefore heat energy is saved. The present intention is also advantageous in not having a problem involved with the use of a spin coat method for formation of a homogeneous film that wastes more than 80% of materials.

The present application is based on Japanese Priority Application No. 2004-306272 filed on Oct. 21, 2004, with the Japanese Patent Office, the entire contents of which are hereby incorporated by reference.

INDUSTRIAL APPLICABILITY

The heat insulating stamper of the present invention having a thermally and mechanically continuous structure is manufactured with a simplified process and reduced manufacturing energy, and may be used for manufacturing optical disc substrates, for example.

The invention claimed is:

1. A heat insulating stamper with a pattern on a surface, comprising:
    an uppermost section made of a metal material;
    a lowermost section made of a metal material; and
    a middle section having a heat conductivity lower than the uppermost section,
    wherein the metal material of the lowermost section is same as the metal material of the uppermost section, and
    wherein heat insulating portions are dispersed in a metal material forming the middle section, and a concentration of the heat insulating portions is higher in a region of the middle section directly below the uppermost section than in other regions of the middle section and lowers toward the lowermost section such that only the metal material forming the middle section exists on the lowermost section.

2. The heat insulating stamper as claimed in claim 1, wherein the heat insulating portions include heat resisting substances dispersed in the metal material of the middle section.

3. The heat insulating stamper as claimed in claim 1, wherein the heat insulating portions are defined by minute voids present within the metal material of the middle section.

4. The heat insulating stamper as claimed in claim 1,
    wherein the middle section is in the form of a layer interposed between the uppermost section and the lowermost section; and
    the heat resisting substances are dispersed in the metal material of middle section such that concentration of the heat resisting substances varies at least in a depth direction of the layer.

5. The heat insulating stamper as claimed in claim 1, wherein the metal material includes Ni.

6. The heat insulating stamper as claimed in claim 2, wherein the heat resisting substances include at least one of a heat resisting resin and a heat resisting inorganic material.

7. The heat insulating stamper as claimed in claim 6, wherein the heat resisting resin includes at least one of particles of a fluorinated resin (PTFE: polytetrafluoroethylene, PFA: perfluoroalkoxy resin, ETFE: tetrafluoretilen, PVDF: polyvinylidene fluoride), aromatic polyimide particles, aromatic polyamide particles, and silicon resin particles.

8. The heat insulating stamper as claimed in claim 6, wherein the heat resisting inorganic material includes at least one of zirconia series, alumina series, silicon carbide series, and silicon nitride series.

* * * * *